United States Patent
Yu et al.

(10) Patent No.: US 9,960,686 B2
(45) Date of Patent: May 1, 2018

(54) SYSTEM AND METHOD FOR DETECTING A LOSS OF AC POWER IN A SWITCHED-MODE POWER SUPPLY

(71) Applicant: Infineon Technologies Austria AG, Villach (AT)

(72) Inventors: Weifu Yu, Singapore (SG); Nitin Agarwal, Singapore (SG); Mingping Mao, Singapore (SG); Guoxing Zhang, Singapore (SG)

(73) Assignee: INFINEON TECHNOLOGIES AUSTRIA AG, Villach (AT)

(*) Notice: Subject to any disclaimer, the term of this patent is extended or adjusted under 35 U.S.C. 154(b) by 223 days.

(21) Appl. No.: 14/929,029

(22) Filed: Oct. 30, 2015

(65) Prior Publication Data
US 2016/0141964 A1    May 19, 2016

Related U.S. Application Data

(60) Provisional application No. 62/080,777, filed on Nov. 17, 2014.

(51) Int. Cl.
| | | |
|---|---|---|
| H02M 3/335 | (2006.01) | |
| H02M 1/36 | (2007.01) | |
| H02M 1/42 | (2007.01) | |
| H02M 1/00 | (2006.01) | |

(52) U.S. Cl.
CPC ......... *H02M 3/33507* (2013.01); *H02M 1/36* (2013.01); *H02M 1/4225* (2013.01); *H02M 2001/007* (2013.01); *H02M 2001/0096* (2013.01); *Y02B 70/126* (2013.01)

(58) Field of Classification Search
CPC ... H02M 2001/007; H02M 2001/0096; H02M 1/36
See application file for complete search history.

(56) References Cited

U.S. PATENT DOCUMENTS

| | | | | |
|---|---|---|---|---|
| 5,546,300 A | * | 8/1996 | Lee | H02M 7/53871 |
| | | | | 315/209 R |
| 5,737,204 A | * | 4/1998 | Brown | H02J 9/062 |
| | | | | 323/285 |
| 5,771,161 A | * | 6/1998 | Jackson | H02J 3/01 |
| | | | | 307/64 |
| 5,875,103 A | * | 2/1999 | Bhagwat | H02M 3/3376 |
| | | | | 363/17 |
| 6,069,800 A | | 5/2000 | Cross et al. | |
| 8,824,171 B2 | * | 9/2014 | Kim | H02M 3/33553 |
| | | | | 363/21.04 |

(Continued)

FOREIGN PATENT DOCUMENTS

| | | |
|---|---|---|
| CN | 102116822 A | 7/2011 |
| CN | 103219877 A | 7/2013 |

(Continued)

*Primary Examiner* — Timothy J Dole
*Assistant Examiner* — Yusef Ahmed
(74) *Attorney, Agent, or Firm* — Slater Matsil, LLP (57) ABSTRACT

In accordance with an embodiment, a method of operating a power supply includes detecting a loss of at least one of an AC input voltage an AC input power at an input of the power supply, and increasing a switching frequency of the power supply upon detection of the loss of the AC input voltage or AC input power.

26 Claims, 6 Drawing Sheets

(56) References Cited

U.S. PATENT DOCUMENTS

| | | | | |
|---|---|---|---|---|
| 8,842,449 B1* | 9/2014 | Tong | ................ | H02M 3/33507 363/21.02 |
| 9,438,119 B1* | 9/2016 | Hwang | ................ | H02M 3/335 |
| 2008/0197817 A1* | 8/2008 | Colbeck | ............. | H02M 1/4225 323/205 |
| 2008/0198638 A1* | 8/2008 | Reinberger | ......... | H02M 3/3376 363/74 |
| 2009/0091957 A1* | 4/2009 | Orr | .................... | H02M 1/4225 363/79 |
| 2011/0080102 A1* | 4/2011 | Ge | .................... | H05B 33/0815 315/200 R |
| 2011/0249476 A1* | 10/2011 | Chen | ................... | H02H 1/0007 363/52 |
| 2012/0051101 A1* | 3/2012 | El-Barbari | ............ | H02M 7/515 363/49 |
| 2012/0074924 A1* | 3/2012 | Dequina | ............... | H02M 3/156 323/351 |
| 2012/0112657 A1* | 5/2012 | Van Der Veen | .... | H02M 1/4225 315/291 |
| 2013/0039104 A1* | 2/2013 | Sharma | .................. | H02M 1/10 363/123 |
| 2013/0188401 A1* | 7/2013 | Jin | .......................... | H02H 3/14 363/21.17 |
| 2014/0009978 A1* | 1/2014 | Brinlee | ............. | H02M 3/33569 363/25 |
| 2014/0119084 A1* | 5/2014 | Ashikaga | ................ | H02M 1/32 363/126 |
| 2015/0117062 A1* | 4/2015 | Jin | ...................... | H02M 1/4241 363/17 |
| 2015/0188468 A1* | 7/2015 | Xu | .......................... | H02P 9/007 290/44 |
| 2015/0198634 A1* | 7/2015 | Brinlee | .................. | G01R 31/28 324/72.5 |
| 2015/0301126 A1* | 10/2015 | Marchand | ................. | G06F 1/30 324/764.01 |
| 2015/0303815 A1* | 10/2015 | Chen | .................... | H02M 3/158 363/21.04 |
| 2016/0105095 A1* | 4/2016 | Mayell | ................ | H02M 1/4225 323/205 |
| 2016/0141951 A1* | 5/2016 | Mao | ....................... | H02M 1/36 363/21.02 |
| 2016/0294293 A1* | 10/2016 | Hayakawa | ........ | H02M 3/33523 |
| 2016/0365799 A1* | 12/2016 | Nakano | ............. | H02M 3/33546 |

FOREIGN PATENT DOCUMENTS

| | | |
|---|---|---|
| JP | 2014007818 A | 1/2014 |
| KR | 20030044125 A | 6/2003 |

\* cited by examiner

FIG. 7

SYSTEM AND METHOD FOR DETECTING A LOSS OF AC POWER IN A SWITCHED-MODE POWER SUPPLY

This application claims the benefit of U.S. Provisional Application No. 62/080,777, entitled "System and Method for a Switched-Mode Power Supply," filed on Nov. 17, 2014, which application is hereby incorporated herein by reference.

TECHNICAL FIELD

The present disclosure relates generally to an electronic device, and more particularly to a system and method for a switched mode power supply.

BACKGROUND

Power supply systems are pervasive in many electronic applications from computers to automobiles. Generally, voltages within a power supply system are generated by performing a DC-DC, DC-AC, and/or AC-DC conversion by operating a switch loaded with an inductor or transformer. One class of such systems includes switched mode power supplies (SMPS). An SMPS is usually more efficient than other types of power conversion systems because power conversion is performed by controlled charging and discharging of the inductor or transformer and reduces energy lost due to power dissipation across resistive voltage drops.

A SMPS usually includes at least one switch and an inductor or transformer. Some specific topologies include buck converters, boost converters, and flyback converters, among others. A control circuit is commonly used to open and close the switch to charge and discharge the inductor. In some applications, the current supplied to the load and/or the voltage supplied to the load is controlled via a feedback loop.

One application of an SMPS is as a power supply for a light emitting diode (LED), such as those used in residential and commercial lighting applications to replace incandescent light bulbs and compact florescent lamps (CFL). In some applications, a SMPS is used to convert an AC line voltage to a DC current in order to power the LED.

SUMMARY

In accordance with an embodiment, a method of operating a power supply includes detecting a loss of at least one of an AC input voltage an AC input power at an input of the power supply, and increasing a switching frequency of the power supply upon detection of the loss of the AC input voltage or AC input power.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for a switched-mode power supply having a switched-mode power factor correction (PFC) followed by a resonant DC/DC power converter. Embodiments of the present invention may also be applied to other switched-mode power supply configurations and other systems and applications including other circuits that switch including, but not limited to power systems.

In an embodiment of the present invention, a power supply system that includes a first stage AC/DC converter followed by a resonant DC/DC converter is configured to detect a loss of AC input power and maintain power to a portion of a load circuit for a period of time after the AC input power has been lost. In an embodiment, a primary-side controller detects the loss of AC input power by monitoring a rectified input signal and/or comparing an output of the AC/DC converter to a threshold. When the loss of AC input power is detected, a switching signal provided to the AC/DC converter is deactivated and a switching signal provided to the resonant DC/DC converter is increased in frequency.

This increase in frequency causes a transient decrease in an output voltage of the resonant DC/DC converter. This transient voltage decrease may be detected by a load circuit coupled to an output of the resonant DC/DC converter and used as a signal to initiate a power down sequence. Such a power down sequence may include writing data to memory. In some embodiments, this load circuit may be supplied by a voltage regulator coupled between the output of the resonant DC/DC converter and the load circuit. Accordingly, the regulated voltage provided by the voltage regulator may effectively stay compliant during the duration of the shut-down procedure.

Figure 1:
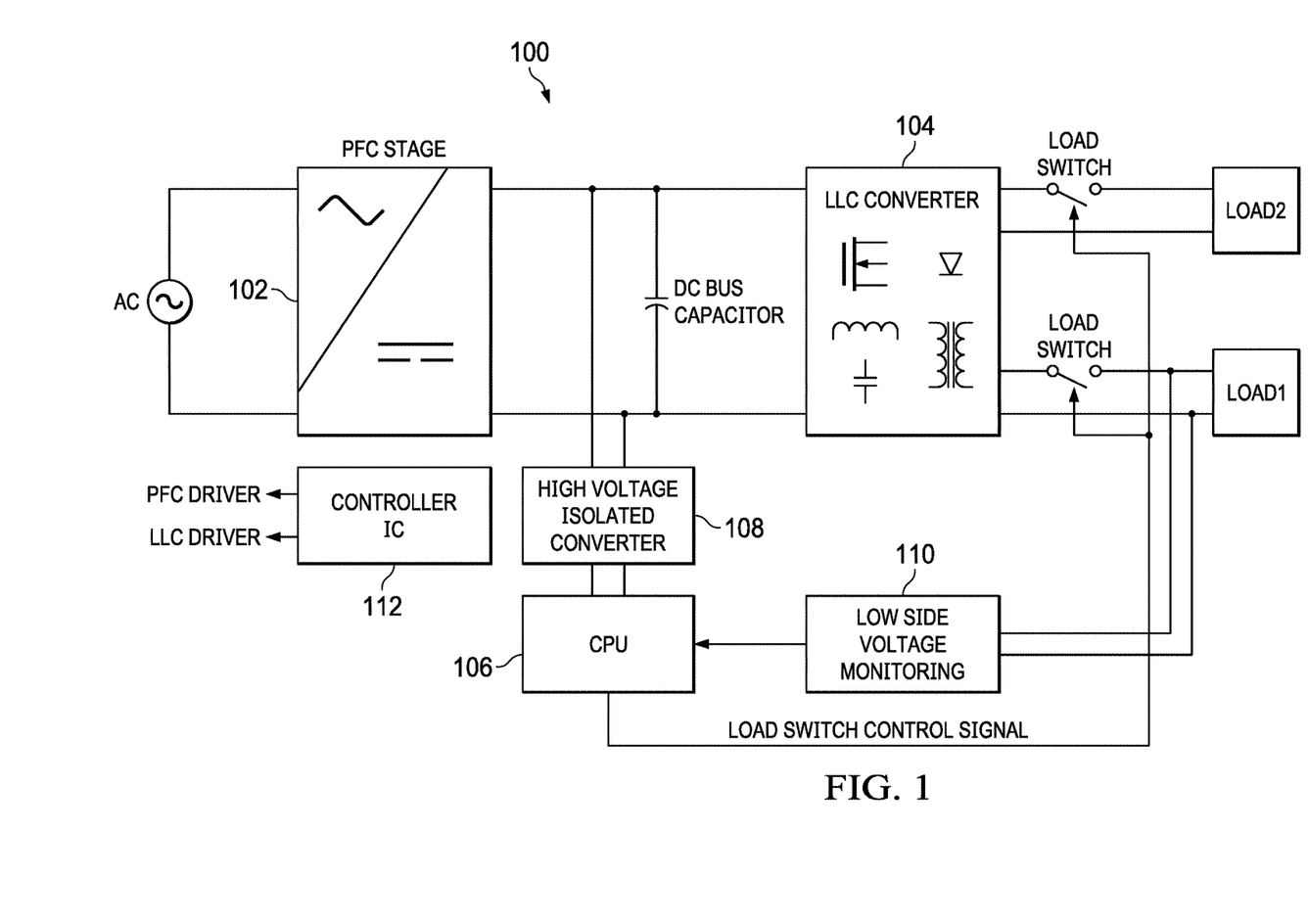
FIG. 1 illustrates an exemplary power supply system.

FIG. 1 illustrates an exemplary switched-mode power supply system 100 that may be used to provide power to an electronic system, such as a flat screen monitor or television set. As shown, switched-mode power supply system 100 includes two stages: a power factor correction (PFC) stage 102 followed by a resonant mode switched-more power supply 104 such as an inductor-inductor-capacitor LLC power supply converter. PFC stage 102 is configured to convert an AC line voltage into a DC bus voltage, while LLC stage 104 is configured to convert the DC bus voltage output of PFC stage 102 to one or more DC power outputs for the system. As shown, LLC power supply converter 102 includes two outputs coupled to loads represented as Load1 and Load 2. In a system such as a flat screen television set, Load1 may represent audio circuitry, while Load2 may represent a power supply output coupled to backlight circuitry. As shown, the output of LLC power supply converter 104 that is coupled to Load1 also provides power to CPU block 106, which is representative of digital control circuitry of a particular application. In various systems, PFC stage 102 and LLC converter 104 is controlled by controller IC 112.

In one case, for example, a power supply system used to provide power to a medium to large size LED television set, LLC power supply converter 104 may be configured to provide multiple voltage outputs to supply the audio circuitry, LED drivers and LED backlighting. In addition, a lower voltage, such as 3.5 V may be used to supply a processor, such as a microcontroller, on the main board of the television set.

In many systems, such as flat screen television sets, circuitry is included to detect the loss of AC power in the system and then execute a shutdown sequence after the AC power loss is detected. This shutdown sequence may include, for example, writing data into memory. In the case of a television set, the previous state of the television may be written into a memory so that when power is reapplied to the system, the television starts up in its previous state. Such data may include but are not limited to channel selection settings, audio mode settings, color settings, contrast settings, and the like. In the exemplary system of FIG. 1, a high voltage isolated power converter 108 is coupled between the DC bus output of PFC stage 102 and CPU 106. High voltage isolated power converter 108 may be implemented using a flyback auxiliary converter that may include various passive devices, a transformer, an opto-coupler and other components. When a loss of power is detected by CPU 106, either via high voltage isolated power converter 108 or via load side voltage monitoring circuitry 110, CPU 106 opens the load switches coupled between the outputs of the LLC converter and respective loads Load1 and Load 2 in order to conserve power long enough to complete the shutdown sequence. This high voltage isolated power converter 108 may also be used to provide standby power to CPU 106, for example, when the user of the television "turns-off" the television via a remote control. During this standby mode, LLC converter 104 is shut down in order to conserve power, but power is maintained at the CPU 106, for example, in order to perform standby operations such as operating clock circuitry and polling an IR remote control sensor.

When the input AC voltage is completely removed, however, the DC bus voltage at the output of the PFC begins to decrease. However, once the DC bus voltage at the output of PFC stage 102 crosses the under voltage point (UVP) of the LLC converter, LLC converter 104 stops switching to prevent LLC converter 104 from entering a capacitive mode of operation, which may lead to hard switching of LLC converter 104 when the bus drops to a low voltage level. In such a situation, the output voltage of LLC converter 104 may lose regulation and decrease in voltage. In one instance, once the decrease in output voltage is detected by load side voltage monitoring block 110, for example, when a nominally 12 V output voltage drops below 10 V, CPU 106 initiates a shutdown sequence and begins to store data. This shutdown and data storage sequence may take between half a second to about one second to complete, which means that power to CPU 106 needs to be maintained during the duration of this shutdown and data storage sequence.

Figure 2:
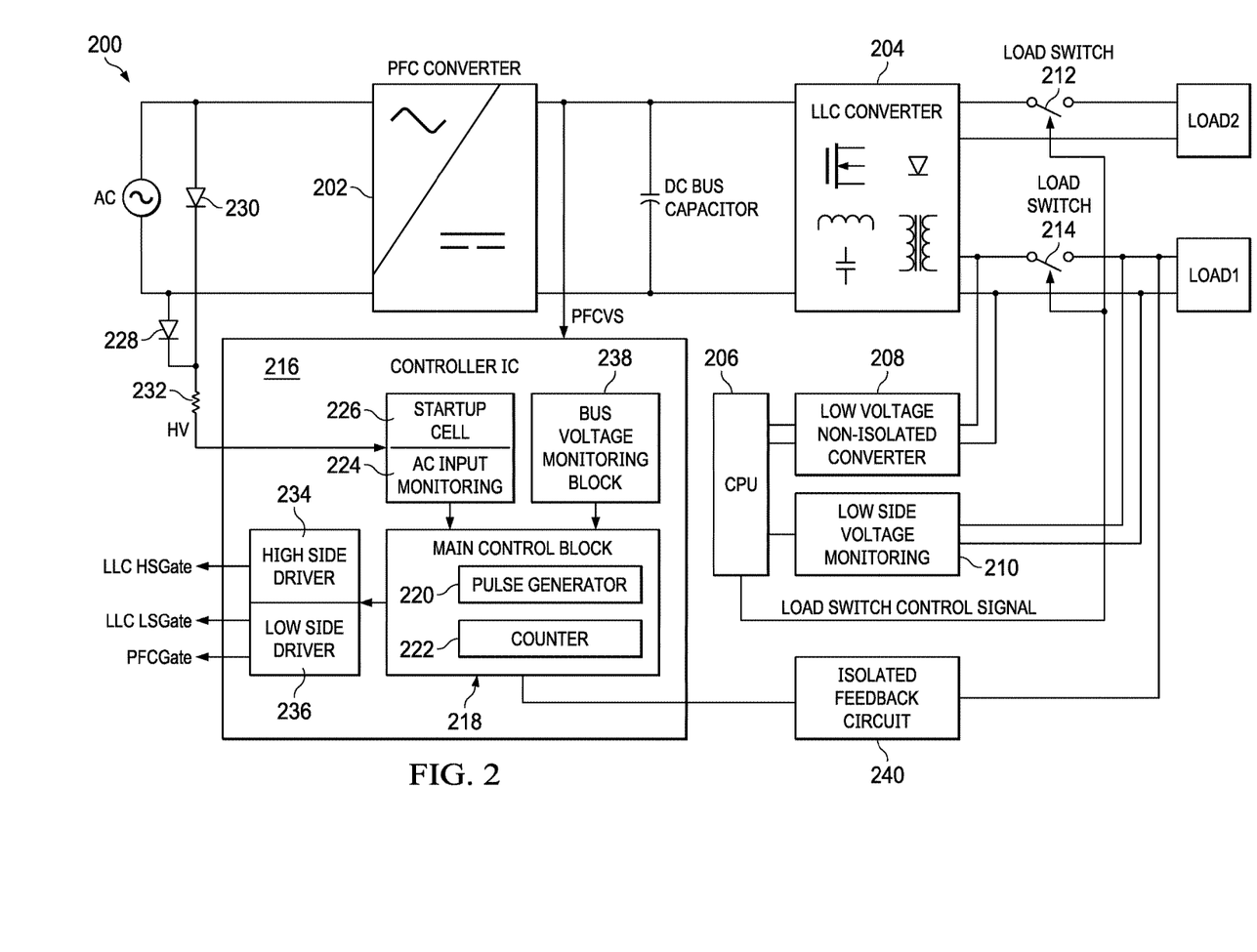
FIG. 2 illustrates an embodiment power supply system.

FIG. 2 illustrates a switched-mode power supply system 200 according to an embodiment of the present invention. As shown the embodiment switched-mode power supply system includes a PFC 202 followed by an LLC converter 204. In one particular alternative embodiment, LLC converter 204 may be implemented using another type of resonant power converter circuit such as a series resonant power converter. Moreover, PFC 202 may be implemented using an AC/DC converter that does not provide power factor correction.

In the illustrated example, LLC converter 204 has two power supply output ports coupled to loads represented by blocks Load1 and Load2. It should be understood that in alternative embodiments, LLC converter 204 may have more than two power supply output ports or may have only a single output port. In an embodiment, power is supplied to CPU 206 from the output of the LLC converter 204 during normal operation or via a low voltage non-isolated power converter 208 during shut down operations after the AC power has been removed from the input to PFC converter 202. This low voltage non-isolated power converter 208 may be implemented, for example, using a simple switched-mode buck or boost converter, as well as other known power supply topologies. Alternatively, other power supply circuits may be used including but not limited to isolated power converters and linear regulators.

In an embodiment, load side voltage monitoring circuit 210 detects a power shutdown condition as is described below. When the power shutdown condition is detected, CPU 206 opens load switches 212 and 214 coupled between the output of the LLC converter and the loads in order to conserve power during the shutdown mode, and then initiates a shutdown sequence that may include, for example, saving data. These load switches 212 and 214 may be implemented, for example, using various semiconductor switching devices including, but not limited to MOSFETs, IGBTs and other devices. Alternatively, other types of controllable electric switches such as relays may be used. In an embodiment, CPU 206 and load side voltage monitoring circuit 210 may be disposed on a single chip and/or on a circuit board coupled to the secondary side of the LLC converter. In an LED television system, these components may be disposed on a system control board and/or a system control integrated circuit.

In an embodiment, the controller IC provides the gate control signals for PFC 202 and LLC converter 204. For example, signals LLC HSGate and LLC LSgate drive high-side and load-side switches of LLC converter 204, respectively, and signal PFCGate drives a switch in PFC 202. In an embodiment, these gate control signals are generated by high side driver 234 and low side driver 236 disposed on controller IC 216. Alternatively, external driver circuits may be used. During normal operating modes, main control block 218 of the Controller IC 216 implements switch mode power supply algorithms for PFC 202 and LLC 204. The main control block 218 may be implemented, for example, using analog circuitry, digital circuitry, or a combination thereof. In various embodiments, various power supply control circuits, methods and algorithms known in the art may be used. For example, for PFC 202, main control block 218 may generate a pulse width modulated signal for PFC gate based on an output voltage of the PFC measured by bus voltage monitoring voltage block 238, and may generate a frequency modulated signal for LLC HSGate and LLC LSgate based on an output voltage of the LLC converter measured by isolated feedback circuit 240. Signals PFC gate, LLC HSGate and LLC LSgate may be generated, for example, using a pulse generator 220 in the main control block. In some embodiments, main control block 218 further includes counter 222.

In some embodiments, controller IC 216 further includes an AC Input voltage monitoring circuit 224 and a startup cell 226 used to power controller IC 216 during startup. In one embodiment, startup cell 226 includes a semiconductor switch that couples a rectified AC input voltage to a local low voltage power supply of the controller IC. As shown, the AC input voltage is rectified using two diodes 228 and 230 coupled between the input terminal of the PFC converter 202 and the HV pin of controller IC 216. A series resistor 232 may be included to limit current to the HV input.

In an embodiment, in order to maintain a sufficient input voltage to low voltage non-isolated converter 208, the switching frequency of LLC converter 204 is increased by controller IC 216 in order to maintain some output voltage of LLC converter 204 when controller IC 216 detects a loss of AC power supply voltage. For example, in one embodiment, a nominal switching frequency of LLC converter 204 of about 100 KHz is increased to about 160 KHz when the loss of AC input power is detected. Alternatively, other switching frequencies may be used. In some embodiments, the switching frequency is increased to a predetermined switching frequency. This loss of AC power supply voltage may be determined, for example, using AC input monitoring block 224 to detect as loss of AC input voltage and/or by the bus monitoring block to detect a decrease in the output voltage of PFC converter 202.

In some embodiments, the increase of switching frequency of LLC converter 204 causes a transient voltage drop in the output voltage of LLC converter 204. This transient voltage drop is used as a way to signal load side voltage monitoring circuit 210 to start a shutdown procedure. Because LLC converter 204 remains switching, albeit at a high frequency, the output voltage of LLC converter 204 may decay at a reduced rate with respect to conventional embodiments that completely shut off LLC converter 204 when power is lost. Accordingly, low voltage non-isolated converter 208 may maintain regulation at 3.5 V, or at whatever supply voltage is used by CPU 206 and other circuits involved in the shutdown and data storage procedure.

Figure 3:
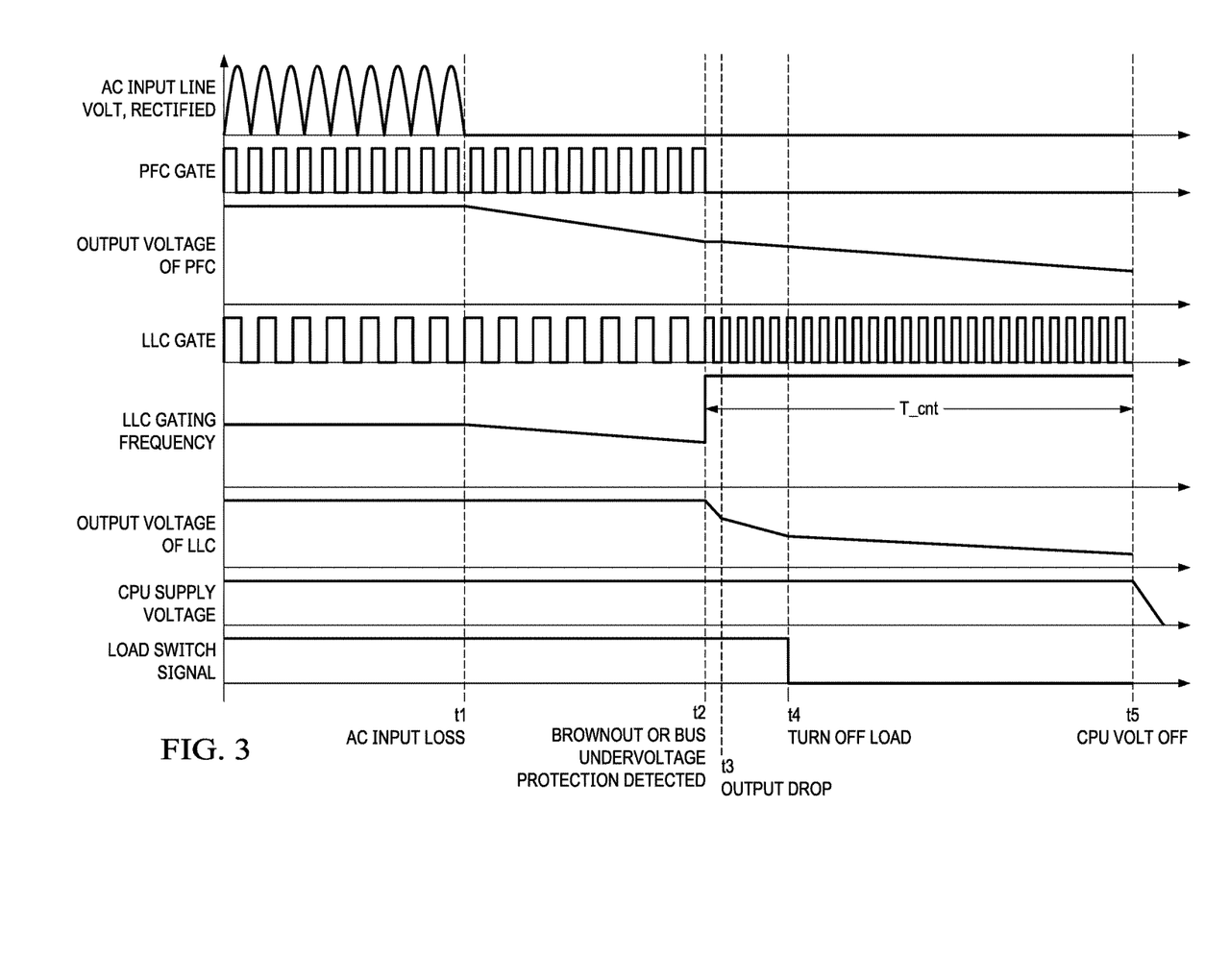
FIG. 3 illustrates a waveform diagram showing the operation of an embodiment power supply system.

FIG. 3 shows a waveform diagram illustrating the operation of an embodiment power supply system. Prior to time t1, the power supply system operates in a nominal mode of operation. As shown, a rectified input line voltage is active and both PFC the gate signal and the LLC gate signal indicate active switching while the output voltages of the PFC and the LLC are constant, as well as the CPU supply voltage generated by the low voltage non-isolated converter. At time t1, however, AC input voltage is lost and the rectified AC input voltage is no longer available.

As shown, after t1, the output voltage of the PFC decreases due to the loss of AC input voltage. Once the output voltage of the PFC falls below a threshold at time t2 or when the AC input loss is finally detected after some time, the PFC switching signal PFC gate is deactivated and the gating frequency of the LLC switching signal is increased. This PFC output voltage threshold may be a predetermined threshold of about 280 V in one example. Alternatively, other thresholds may be used. The increase in switching frequency also helps ensure that the LLC converter operates at a frequency higher than the resonant frequency to prevent capacitive mode operation. Between times t2 and t3, the output voltage of the LLC experiences a drop in output voltage due to the increase in switching or gating frequency. This drop in the output voltage of the LLC converter is detected by the load side monitoring circuit on the secondary side of the LLC. At time t4, the CPU at the secondary side of the LLC converter turns off the load by opening the load switches via the load switch signal. In some embodiments, blanking time or delay is provided between times t3 and t4 to avoid mistriggering. Alternatively, the CPU may open the load switches immediately after time t3.

At time t5, the LLC converter stops switching and the CPU supply voltage is deactivated. Until time t5, however, the CPU supply voltage maintains a stable output voltage. In some embodiments, a counter is used to determine the time at which the LLC converter stops switching. This counter may be implemented using a counter in the main control block of the controller IC as shown in FIG. 2. For example, as shown, a counter or timer having a predefined timeout value T_cnt may be activated at time t2 when the frequency of the LLC gating frequency is increased. When the counter or timer reaches the pre-defined timeout value, the CPU stops operation and reset by IC power supply voltage drop. However, if the CPU supply voltage drops prior to the expiration of the time, the CPU will also stop operation due to the loss of power.

In an embodiment, the LLC timeout operation is implemented in order to provide a way for the circuit to recover operation in case the AC input voltage is reapplied or was temporarily removed. For example, if there is a high voltage between times t2 and t5, which may be referred to as the "handling moment," the DC bus voltage may be charged to the input AC peak voltage value. If the voltage value is very high due to the high AC input voltage, then converter continues operating. Even if the AC input voltage is monitored during the handling moment and allows the auto-restart sequence to takeover, there is a possibility that the controller IC power supply Vcc decreases to a voltage that is too low for the system to restart successfully. Consequently, a short timeout is used to force the controller to be reset in order to guarantee the restart work successfully. In some embodiments, open-loop protection and other feedback related protections are disabled because the converter essentially operates in an open-loop manner during the handling moment.

In one specific example, a timeout period of 1 second is used so that the AC turn off sequence lasts for a maximum of 1 second, or whatever timeout period is selected. After this timeout period, the controller IC stops switching and is reset due to a VCC under voltage lockout condition. The controller IC will be ready to start up again when the AC input is reapplied. If the AC input is reapplied during the timeout period, the controller IC maintains its previous mode of operation to ensure that the CPU supply voltage remains regulated long enough for a shutdown sequence, including writing data to memory, is completed. When the end of the timeout period is reached, the controller IC stops generating switching signals and leaves the operation mode. Accordingly, the controller IC is reset by the VCC under voltage lockout and operation ceases until the next system startup.

In some embodiments, the increase of the LLC switching frequency may occur when the AC input line voltage is first detected in order to provide brownout protection. In other embodiments, the LLC switching frequency is increased only when the output voltage of the PFC falls below the undervoltage protection threshold. In yet other embodiments, the LLC switching frequency is increased when both conditions, namely the loss of AC input line voltage and the decrease of the PFC output voltage below the undervoltage threshold, are met.

Figure 4:
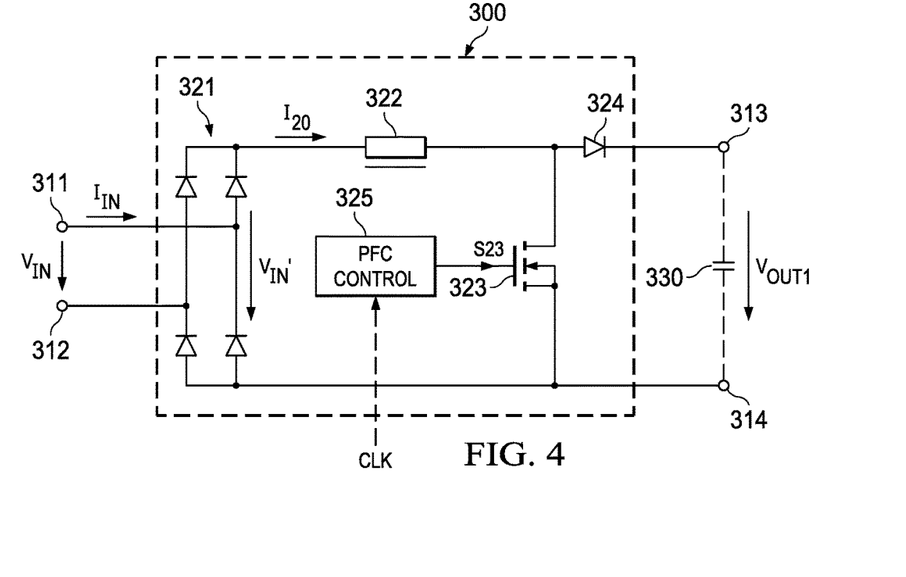
FIG. 4 illustrates a schematic of a power factor correction stage.

FIG. 4 illustrates a conventional PFC 300 that may be used to implement PFC 202 shown in FIG. 2. PFC 300 includes a rectifier circuit 321, such as a bridge rectifier, connected to the input terminals 311, 312. Rectifier circuit 321 receives the input voltage $V_{IN}$ and transforms the input voltage $V_{IN}$ into a corresponding rectified input voltage $V_{IN}'$. When, for example, the input voltage $V_{IN}$ has a sinusoidal waveform, the rectified input voltage $V_{IN}'$ has a waveform corresponding to the absolute value of a sine wave. PFC 300 further has a boost converter stage that receives the rectified input voltage $V_{IN}'$ and generates the first output voltage $V_{OUT1}$. The boost converter stage includes a series circuit including an inductor 322, such as a choke, and an electronic switch 323. This series circuit is coupled to the rectifier arrangement 321 such that the rectified input voltage $V_{IN}'$ is available across the series circuit. The electronic switch 323 is, for example, a transistor, in particular a MOSFET, as illustrated in FIG. 2. However, the use of a MOSFET, specifically of an n-MOSFET, as the electronic switch 323 is only an example. Any other switching component, such as a p-MOSFET, an IGBT (insulated gate bipolar transistor), a BJT (bipolar junction transistor), a JFET (junction field-effect transistor) or a GTO (Gate Turn-Off Thyristor) may be used as well. The same applies to other electronic switches that will be explained herein below.

The PFC 300 further includes a rectifier element 324 connected between a circuit node that is common to the inductor 322 and the electronic switch 323 and one (313) of the output terminals 313, 314. The rectifier element 324 can be implemented as a diode (as illustrated in FIG. 2). However, the rectifier element could also be implemented as a synchronous rectifier (SR) using switching components.

The electronic switch 323 may receive an on/off-modulated, e.g., a pulse-width modulated (PWM), drive signal S23 from a PFC controller 325. The PFC controller 325 may be a conventional PFC controller that generates the on/off-modulated drive signal, for example a PWM signal. In various embodiments, PFC controller generates the modulated drive signal such that the power factor is close to 1, for example between about 0.97 and 1, and such that an output voltage $V_{OUT1}$ at least approximately matches a desired voltage, such as, for example, 400 V. In other words, PFC controller 325 provides on/off-modulated drive signal S23 such that the input current to PFC is in phase with the input voltage Vin. The on/off-modulated drive signal S23 is, for example, generated with a frequency (fixed or variable) that is dependent on a clock signal CLK (illustrated in dashed lines in FIG. 4). This clock signal CLK may be an external clock signal generated by an external clock signal generator (not shown), or may be a clock signal generated in the PFC controller. Such conventional PFC controllers are as such known so that no further explanations are required in this regard.

Figure 5:
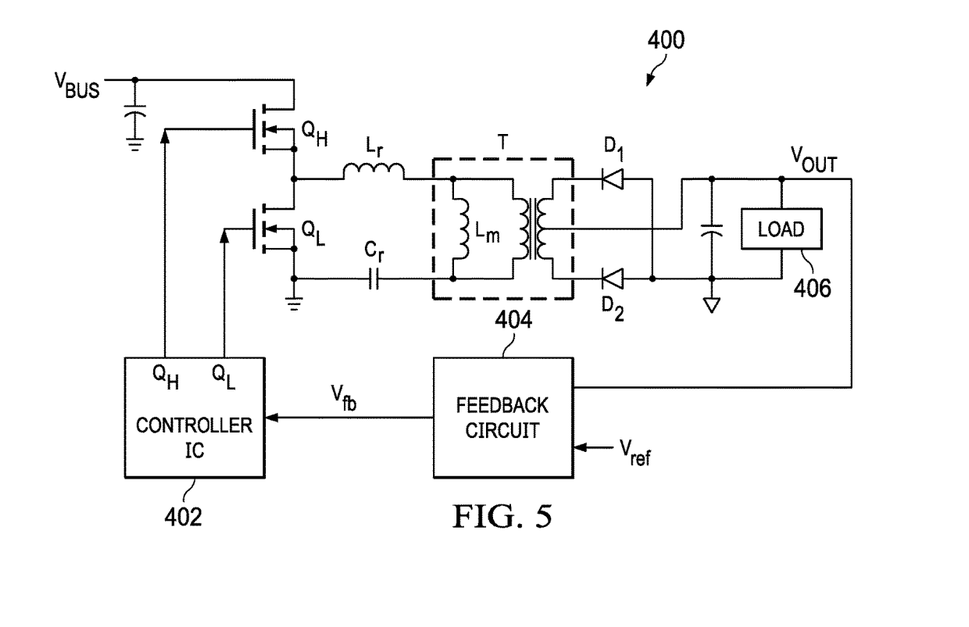
FIG. 5 illustrates a schematic of a inductor-inductor-capacitor (LLC) resonant power converter.

Turning to FIG. 5, illustrated is a schematic drawing of an embodiment of resonant half-bridge power converter 400 that may be used to implement LLC converter 204 shown in FIG. 2. This half-bridge topology is often referred to as an LLC power train circuit topology wherein a duty cycle of each primary-side power switch is set to about 50%, and the switching frequency $f_s$ is varied to control an output characteristic such as an output voltage. As switching frequency $f_s$ is varied, the effective gain of the switching converter changes as switching frequency $f_s$ changes in relation to the resonant frequency of the power converter. In practice, the duty cycle of each primary-side power switch is set to slightly less than 50% to avoid current shoot-through during switching transitions.

The resonant half-bridge power converter is coupled to an input voltage source $V_{BUS}$ and includes controller 402 that regulates a power converter output characteristic such as an output voltage by regulating a switching frequency $f_s$ of the power converter. Controller 402 together with feedback circuit 404 of the power converter senses the output voltage $V_{out}$ of the power converter and a desired output voltage $V_{ref}$ and controls switching frequency $f_s$ of the primary-side power switches to regulate the output voltage $V_{OUT}$ at the desired output voltage $V_{ref}$.

The power converter provides power to a system or load 406 coupled to the output $V_{out}$. While in the illustrated embodiment the power train employs a half-bridge resonant power converter topology, those skilled in the art should understand that other converter topologies such as an isolated resonant full-bridge power converter topology are well within the broad scope of the present invention.

The power converter further includes feedback circuit 404 that is employed to transmit a sensed output characteristic across the isolation boundary provided by the power transformer T to the controller 402. Various circuit devices such as an opto-isolator to provide this isolation function are well known in the art and will not be described further herein in the interest of brevity.

In the primary side of the circuit, two series-coupled power switches, MOSFETs $Q_H$ and $Q_L$, are coupled to two inductors, resonant inductor $L_r$ and the primary winding of the power transformer T, and to capacitor $C_r$. Inductance $L_m$ represents the magnetizing inductance of transformer T, and diodes D1 and D2 are secondary side rectifier diodes. In alternative embodiments, synchronous rectifier power switches may be employed in place of diodes D1 and D2.

The resonant frequency of the LLC power train circuit topology is $f_{RES}$. The resonant frequency $f_{RES}$ can be estimated from the equation $$f_{RES} = \frac{1}{2\pi \times \sqrt{L_r \times C_r}},$$

where $L_r$ and $C_r$ are the inductance and capacitance respectively of the indicated primary-side power train circuit elements illustrated in FIG. 5.

Half bridge LLC resonant switched mode power converters are widely used due to their high conversion efficiency. Embodiment half bridge LLC resonant power converters may be configured to achieve zero voltage switching for primary side switches, and zero current switching for secondary side rectifiers under a wide input voltage range under different load conditions. However, in embodiments that employed a frequency controlled gain, frequency $f_s$ that corresponds to a no load condition may be theoretically infinite. In many conventional half-bridge LLC resonant power converters, the power converter is still operated in a first normal mode under no load or very light load conditions.

Figure 6:
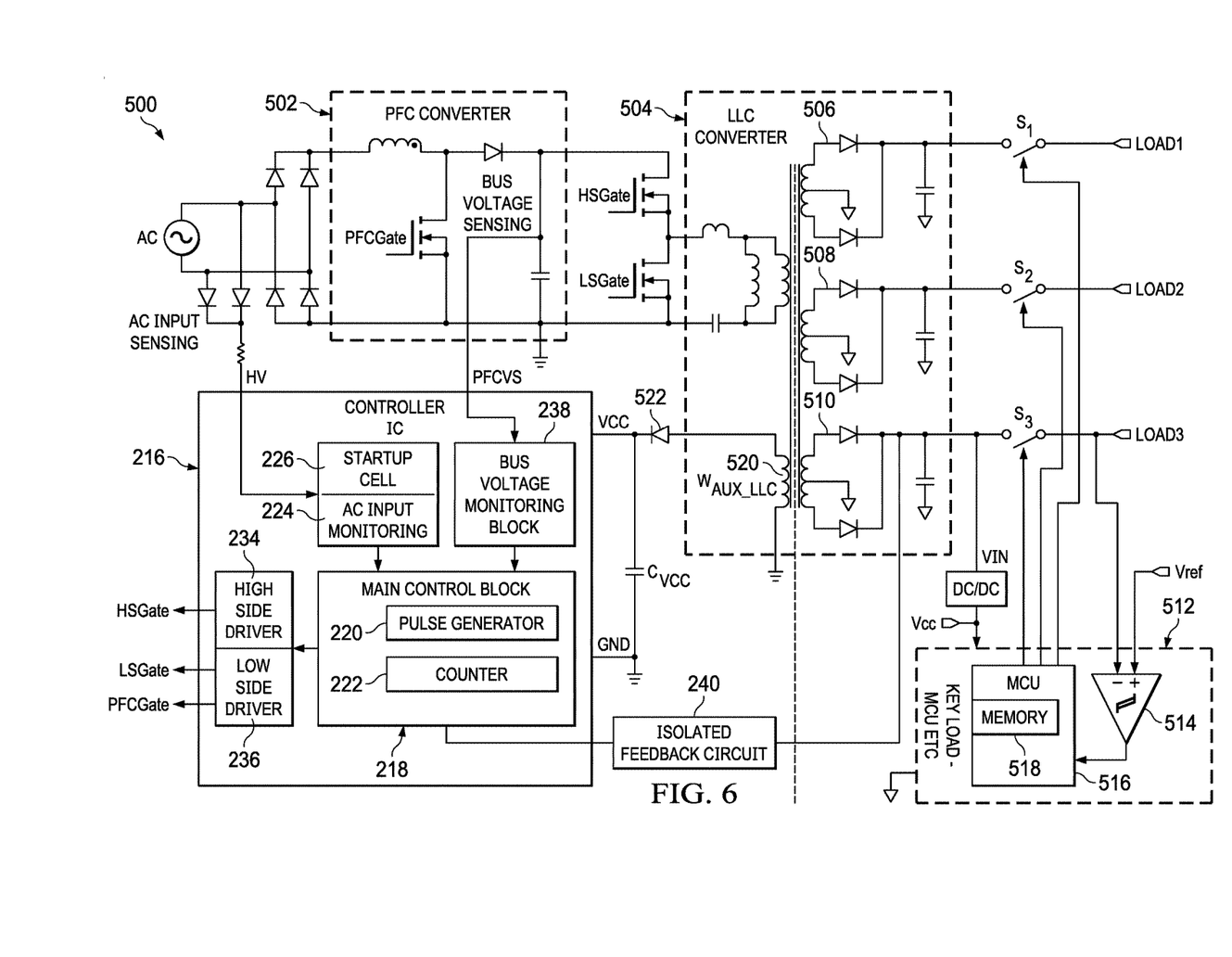
FIG. 6 illustrates an embodiment power supply system.

FIG. 6 illustrates an embodiment power supply system in which further details of the secondary side circuitry are shown, as well as the internal circuitry of PFC 502 and LLC converter 504. As shown, the LLC converter includes three secondary windings 506, 508 and 510 having associated rectifying diodes. These three secondary windings 506, 508 and 510 are coupled to corresponding outputs S1, S2 and S3 that are used to provide power to ports Load1, Load2 and Load3, respectively. A key load block that represents digital control circuitry of the target application monitors the voltage of the Load3 port by comparing this voltage to voltage Vref via a comparator. Alternatively, other voltage monitoring circuits may be used.

As shown, the key load block 512 includes a microcontroller (MCU) 516 including memory 518; however, the key load block may also include other circuitry. The MCU 516 provides control signals that activate and deactivate load switches S1, S2 and S3 coupled between the outputs of the LLC converter 504 and respective output ports Load1, Load2 and Load3. As is further shown, the LLC converter 504 includes an auxiliary winding 520 that is used to provide power to the VCC of the controller IC 216 via a rectifying diode and capacitor $C_{VCC}$.

Figure 7:
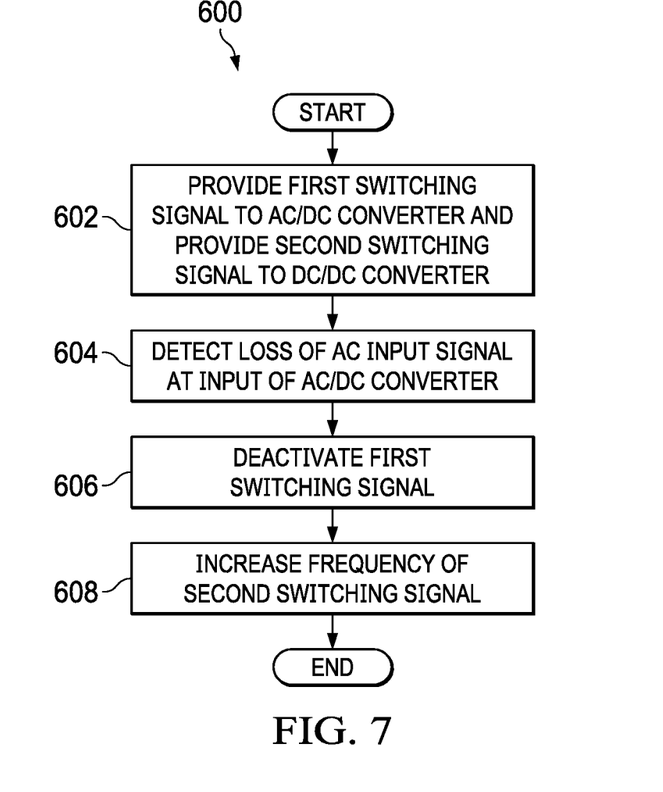
FIG. 7 illustrates a flowchart of an embodiment method.

FIG. 7 illustrates a block diagram of an embodiment method 600 of operating a switched-mode power supply having an AC/DC converter followed by a DC/DC converter. In step 602, the switched mode power supply is operated in a normal operation mode that includes providing a first switching signal to the AC/DC converter and providing a second switching signal to the DC/DC converter. In step 604, a loss of an AC input signal coupled to an input of the AC/DC converter is detected. Based on the detected loss of the AC input signal, the first switching signal is deactivated in step 606 and the switching frequency of the second switching frequency is increased in step 608. As explained above, the increase in switching frequency of the second switching signal may cause a transient voltage decrease an output voltage of the DC/DC converter. This decrease in output voltage may be detected by a circuit coupled to the secondary side of the DC/DC converter as a signal to start an orderly shutdown procedure of the circuit.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media that is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. In addition, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. In addition, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of intraoperative hardware units, including one or more processors as described above, in conjunction with suitable software and/or firmware.

Advantages of some embodiments include the ability of a power converter to continue to supply power to circuitry for a period of time after the AC input voltage has been removed. Another advantage of some embodiment includes the ability to maintain such power using a relatively inexpensive non-isolated power supply. A further advantage of embodiments include the ability of the primary side of a power supply to signal the secondary side of the power supply that input power has been lost without using additional isolated circuitry.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

What is claimed is:

1. A method of operating a switched-mode power supply having an AC/DC converter followed by a DC/DC converter, the method comprising:
operating the switched-mode power supply in a normal operation mode comprising providing a first switching signal to the AC/DC converter and providing a second switching signal to the DC/DC converter;

detecting a loss of an AC input signal coupled to an input of the AC/DC converter; and in response to detecting the loss of the AC input signal, deactivating the first switching signal and increasing a frequency of the second switching signal.

2. The method of claim 1, wherein increasing the frequency of the second switching signal comprises increasing the frequency of the second switching signal to a predetermined switching frequency.

3. The method of claim 2, wherein increasing the frequency of the second switching signal causes a transient decrease in voltage at an output of the DC/DC converter.

4. The method of claim 3, further comprising detecting the transient decrease in voltage at the output of the DC/DC converter.

5. The method of claim 4, further comprising disconnecting loads coupled to at least one output of the DC/DC converter upon detecting the transient decrease in voltage.

6. The method of claim 4, further comprising performing a shutdown procedure in a circuit that receives power from the output of the DC/DC converter upon detecting the transient decrease in voltage.

7. The method of claim 6, further comprising providing power to the circuit that receives power from the output of the DC/DC converter using a voltage regulator coupled between the output of the DC/DC converter and the circuit.

8. The method of claim 6, wherein performing the shutdown procedure comprises writing data to a memory.

9. The method of claim 1, wherein the DC/DC converter comprises a resonant power converter.

10. The method of claim 9, wherein the resonant power converter comprises an inductor-inductor-capacitor (LLC) power converter.

11. The method of claim 9, wherein the AC/DC converter comprises a power factor correction (PFC) circuit.

12. The method of claim 1, wherein detecting the loss of the AC input signal comprises detecting a loss of a rectified AC input signal.

13. The method of claim 1, wherein detecting the loss of the AC input signal comprises:
comparing an output voltage of the DC/DC converter with a predetermined threshold; and
determining that the AC input signal is lost when the output voltage of the DC/DC converter falls below the predetermined threshold.

14. The method of claim 1, wherein detecting the loss of the AC input signal comprises
detecting a loss of a rectified AC input signal;
comparing an output voltage of the DC/DC converter with a predetermined threshold; and
determining that the AC input signal is lost when both of the rectified AC input signal is lost based on the detecting and when the output voltage of the DC/DC converter falls below the predetermined threshold based on the comparing.

15. The method of claim 1, further comprising deactivating the second switching signal with a first time delay after the step of increasing the frequency of the second switching signal.

16. The method of claim 15, wherein deactivating the second switching signal comprises using a counter to produce the first time delay.

17. The method of claim 1, wherein the AC input signal comprises at least one of an AC input voltage or an AC input power.

18. A system comprising:
a pulse generator configured to provide a first switching signal to an AC/DC converter, and configured to provide a second switching signal to a DC/DC converter having an input coupled to an output of the AC/DC converter; and
control circuit configured to
detect a loss of an AC input signal coupled to an input of the AC/DC converter; and
in response to detecting the loss of the AC input signal, deactivating the first switching signal and increasing a frequency of the second switching signal.

19. The system of claim 18 wherein the DC/DC converter comprises a resonant power converter.

20. The system of claim 19, wherein the AC/DC converter comprises a power factor correction (PFC) circuit.

21. The system of claim 18, further comprising:
a further power converter having an input configured to be coupled to an output of the DC/DC converter; and
a further circuit having a power input coupled to an output of the further power converter, wherein the further circuit is configured to detect a transient voltage drop at the output of the DC/DC converter when the frequency of the second switching signal is increased, and initiate a shutdown procedure upon detection of the transient voltage drop.

22. The system of claim 21, further comprising a switch coupled between the output of the DC/DC converter and a load port, wherein the switch comprises a control terminal coupled to an output of the further circuit.

23. The system of claim 22, wherein the further circuit is configured to open the switch via the control terminal upon detection of the transient voltage drop.

24. The system of claim 18, wherein the AC input signal comprises an AC input voltage or an AC input power.

25. A system comprising:
an AC/DC converter;
a resonant converter having an input coupled to an output of the AC/DC converter;
a pulse generator configured to provide a first switching signal to the AC/DC converter, and configured to provide a second switching signal to the resonant converter; and
control circuit configured to
detect a loss of an AC input signal coupled to an input of the AC/DC converter; and
in response to detecting the loss of the AC input signal, deactivating the first switching signal and increasing a frequency of the second switching signal.

26. The system of claim 25, wherein the AC/DC converter comprises a power factor correction (PFC) circuit.

* * * * *